United States Patent
Kusano et al.

(10) Patent No.: US 8,814,172 B2
(45) Date of Patent: Aug. 26, 2014

(54) CYLINDER HEAD GASKET

(75) Inventors: Masanori Kusano, Toyota (JP); Osamu Jinno, Toyota (JP)

(73) Assignee: Nippon Gasket Co., Ltd., Toyota-shi, Aichi (JP)

(*) Notice: Subject to any disclaimer, the term of this patent is extended or adjusted under 35 U.S.C. 154(b) by 49 days.

(21) Appl. No.: 13/394,400

(22) PCT Filed: Jul. 28, 2010

(86) PCT No.: PCT/JP2010/062690
§ 371 (c)(1),
(2), (4) Date: Mar. 6, 2012

(87) PCT Pub. No.: WO2011/048856
PCT Pub. Date: Apr. 28, 2011

(65) Prior Publication Data
US 2012/0161403 A1    Jun. 28, 2012

(30) Foreign Application Priority Data
Oct. 21, 2009  (JP) .................................. 2009-242142

(51) Int. Cl.
*F02F 11/00* (2006.01)
*F16J 15/08* (2006.01)

(52) U.S. Cl.
CPC ........... *F16J 15/0818* (2013.01); *F02F 11/002* (2013.01); *F16J 2015/0862* (2013.01); *F16J 15/0825* (2013.01); *F16J 2015/085* (2013.01)
USPC ..................................................... 277/592

(58) Field of Classification Search
CPC ............................. F16J 15/061; F16J 15/0825
USPC ......... 277/590, 591, 592, 593, 594, 595, 596, 277/598
See application file for complete search history.

(56) References Cited

U.S. PATENT DOCUMENTS

| 6,422,573 B1* | 7/2002 | Sekioka ......................... 277/594 |
| 7,588,252 B2* | 9/2009 | Kasuya .......................... 277/598 |

(Continued)

FOREIGN PATENT DOCUMENTS

| JP | 60-003465 | 1/1985 |
| JP | 01-154364 | 10/1989 |

(Continued)

OTHER PUBLICATIONS

International Search Report for PCT/JP2010/062690 (2 pgs.).

*Primary Examiner* — Kristina Fulton
*Assistant Examiner* — Nathan Cumar
(74) *Attorney, Agent, or Firm* — Flynn, Thiel, Boutell & Tanis, P.C.

(57) ABSTRACT

A cylinder head gasket 1 has a gas seal plate P1 in which a combustion chamber hole 11 is drilled, an oil seal plate P2 in which an oil hole 13 is drilled, and a main plate P3 provided between the gas seal plate and the oil seal plate. Plate thicknesses of the gas seal plate, the oil seal plate, and the main plate are made different from each other, the plate thickness of the gas seal plate is larger than the plate thicknesses of the oil seal plate and the main plate, and end portions of the gas seal plate, the oil seal plate, and the main plate are connected to each other. A combustion gas, lubricant oil or the like from a combustion chamber or an oil passage can be effectively sealed, and the cylinder head gasket can be manufactured inexpensively.

12 Claims, 4 Drawing Sheets

(56) References Cited

U.S. PATENT DOCUMENTS

| | | | |
|---|---|---|---|
| 7,726,662 B2 * | 6/2010 | Foster | 277/592 |
| 7,806,416 B2 * | 10/2010 | Diez | 277/593 |
| 2005/0269789 A1 * | 12/2005 | Kameyama | 277/592 |
| 2008/0007014 A1 * | 1/2008 | Foster | 277/594 |

FOREIGN PATENT DOCUMENTS

| | | | | |
|---|---|---|---|---|
| JP | 04-088769 | 7/1992 | | |
| JP | 05-044847 | 2/1993 | | |
| JP | 08-233105 | 9/1996 | | |
| JP | 2000-065210 | 3/2000 | | |
| JP | 2001-032937 | 2/2001 | | |
| JP | 2001-208203 | 8/2001 | | |
| JP | 2001208203 A | * 8/2001 | | F16J 15/08 |
| JP | 2001-280502 | 10/2001 | | |
| JP | 2002-323135 | 11/2002 | | |

* cited by examiner

CYLINDER HEAD GASKET

TECHNICAL FIELD

The present invention relates to a cylinder head gasket, and more particularly to a cylinder head gasket sandwiched between a cylinder block and a cylinder head in which a combustion chamber, an oil passage, a water passage, and a bolt insertion passage are formed and provided with a combustion chamber hole drilled at a position of the combustion chamber and an oil hole drilled at a position of the oil passage.

BACKGROUND ART

A cylinder head gasket sandwiched between a cylinder block and a cylinder head in which a combustion chamber, an oil passage, a water passage, and a bolt insertion passage are formed and provided with a combustion chamber hole drilled at a position of the combustion chamber and an oil hole drilled at a position of the oil passage has conventionally been known.

In such cylinder gaskets, a load is concentrated at a periphery of the combustion chamber in order to seal a combustion gas from the combustion chamber hole, and specifically, those with an increased plate thickness at the periphery of the combustion chamber hole or with beads surrounding the combustion chamber hole formed are known (Patent Documents 1 to 7).

PRIOR ART DOCUMENTS

Patent Literature

Patent Literature 1: Japanese Laid-Open Patent Application No. 60-3465
Patent Literature 2: Japanese Laid-Open Utility Model Application No. 4-88769
Patent Literature 3: Japanese Laid-Open Patent Application No. 5-44847
Patent Literature 4: Japanese Laid-Open Patent Application No. 8-233105
Patent Literature 5: Japanese Laid-Open Patent Application No. 2001-032937
Patent Literature 6: Japanese Laid-Open Patent Application No. 2001-280502
Patent Literature 7: Japanese Laid-Open Patent Application No. 2002-323135

SUMMARY OF INVENTION

Problems to be Solved by the Invention

However, as a result of the concentration of the load to the periphery of the combustion chamber hole, leakage of lubricant oil and the like from the oil passage formed in the cylinder block and the cylinder head causes a problem, and an improvement of the sealing properties in the portion has been in demand.

In view of such a problem, the present invention provides an inexpensive cylinder head gasket capable of effectively sealing a combustion gas or the lubricant oil from the combustion chamber and the oil passage.

Means for Solving the Problems

That is, a cylinder head gasket according to the present invention is a cylinder head gasket sandwiched between a cylinder block and a cylinder head in which a combustion chamber, an oil passage, a water passage, and a bolt insertion passage are formed and provided with a combustion chamber hole drilled at a position of the combustion chamber and an oil hole drilled at a position of the oil passage, wherein
the cylinder head gasket comprises a gas seal plate in which the combustion chamber hole is drilled, an oil seal plate in which the oil hole is drilled, and a main plate provided between the gas seal plate and oil seal plate;
the plate thicknesses of the gas seal plate, the oil seal plate, and the main plate are made different from each other, and the plate thickness of the gas seal plate is set larger than the plate thicknesses of the oil seal plate and the main plate; and
end portions of the gas seal plate, the oil seal plate, and the main plate are connected to each other.

Advantageous Effects of the Invention

According to the above-described invention, since the plate thicknesses of the gas seal plate, the oil seal plate, and the main plate are made different from each other, and the plate thickness of the gas seal plate is set larger than the plate thicknesses of the oil seal plate and the main plate, a load to the gas seal plate can be concentrated during assembling of an engine, and a combustion gas can be effectively sealed.

Moreover, since the plate thicknesses of the oil seal plate and the main plate are made different from each other, loads acting on the oil seal plate and the main plate can be made different and the load in the periphery of the oil hole can be adjusted, whereby lubricant oil can be sealed.

Moreover, since the combustion gas, the lubricant oil and the like can be effectively sealed, even in a single-layer cylinder head gasket in which three plates are connected, a cylinder head gasket can be obtained inexpensively.

MODE FOR CARRYING OUT THE INVENTION

Figure 1:
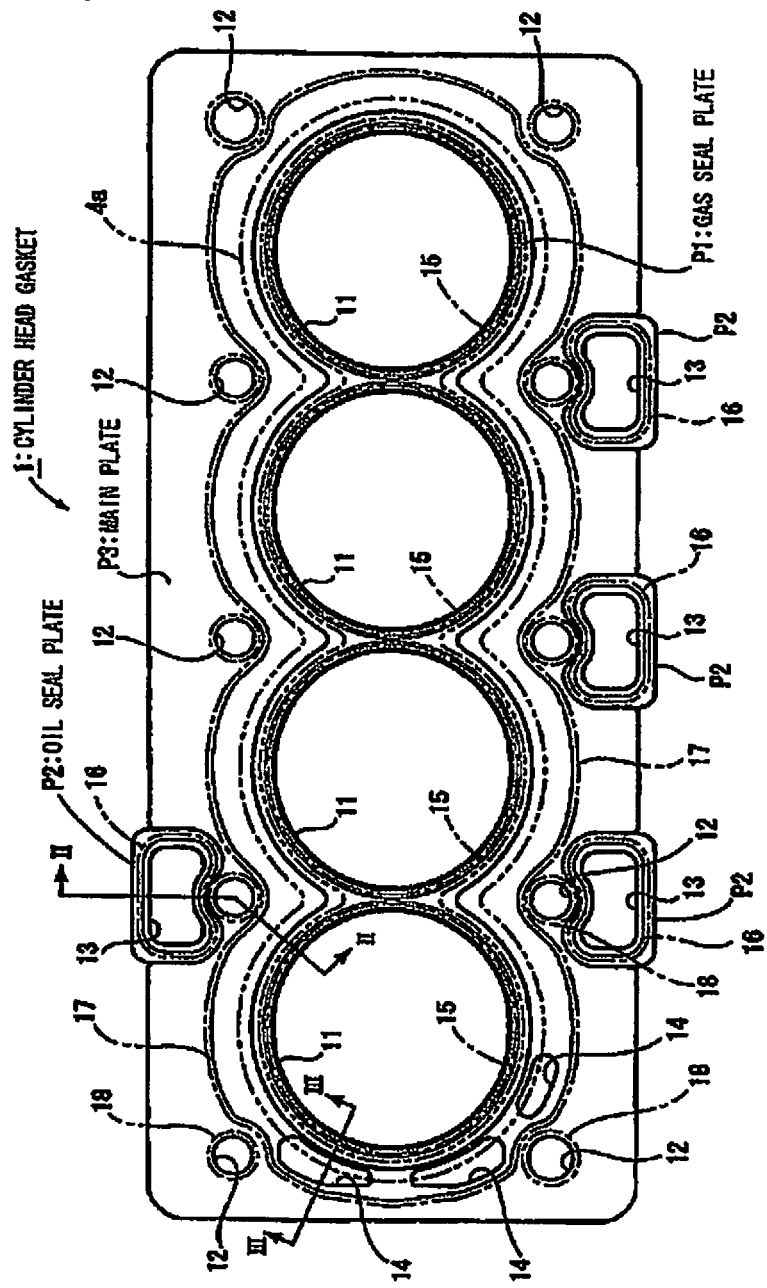
FIG. 1 is a plan view illustrating a cylinder head gasket according to a first embodiment.
Figure 2:
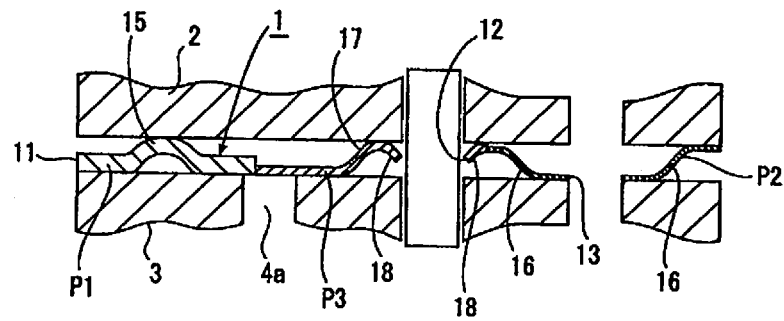
FIG. 2 is a sectional view illustrating II-II part in FIG. 1.
Figure 3:
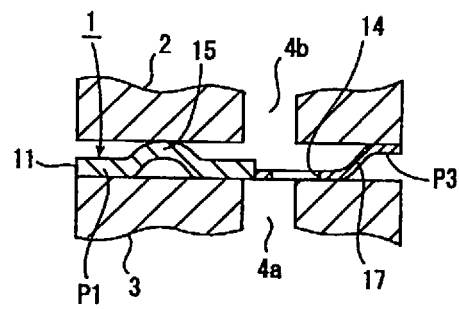
FIG. 3 is a sectional view illustrating III-III part in FIG. 1.

The present invention will be described below by referring to illustrated embodiments. FIG. 1 illustrates a plan view of a cylinder head gasket 1 according to a first embodiment, and as illustrated in FIGS. 2 and 3, the cylinder head gasket 1 is sandwiched between a cylinder head 2 and a cylinder block 3.

Four combustion chambers aligned on a straight line, a bolt insertion passage which connects the cylinder head 2 and the cylinder block 3 to each other, and an oil passage through which lubricant oil and a blowby gas communicate are provided in the cylinder head 2 and the cylinder block 3.

Moreover, a water passage through which cooling water communicates is formed in the cylinder block 3 and the cylinder head 2, and this water passage is formed of a water jacket 4a (a two-dot-chain line in the FIG. 2) formed on the cylinder block 3 and surrounding the combustion chamber and a head-side water passage 4b (see FIG. 3) formed in the cylinder head 2 and formed so as to overlap at least a part of the water jacket 4a.

In the cylinder head gasket 1, a combustion chamber hole 11 drilled at a position of the combustion chamber, a bolt hole 12 drilled at a position of the bolt insertion passage, an oil hole 13 drilled at a position of the oil passage, and a water hole 14 through which the water jacket 4a and the head-side water passage 4b constituting the water passage communicate with each other are provided.

Then, the cylinder head gasket 1 of this embodiment has a configuration in which three types of plates P1 to P3 with different plate thicknesses are connected and comprises the gas seal plate P1 in which the combustion chamber hole 11 is drilled, the oil seal plate P2 in which the oil hole 13 is drilled, and the main plate P3 provided between the gas seal plate P1 and the oil seal plate P2 and in which the bolt hole 12 and the water hole 14 are drilled.

The plate thickness of the gas seal plate P1 is larger than the plate thicknesses of the oil seal plate P2 and the main plate P3 as illustrated in FIG. 2, and the plate thickness of the oil seal plate P2 is smaller than that of the main plate P3 as illustrated in FIG. 2.

Moreover, end portions of the gas seal plate P1, the oil seal plate P2, and the main plate P3 are abutted to each other so as not to overlap, and the abutment portions are connected by spot welding, laser welding or the like.

Furthermore, coatings are formed on front surfaces and back surfaces of the gas seal plate P1, the oil seal plate P2, and the main plate P3, and the plate thicknesses of the gas seal plate P1, the oil seal plate P2, and the main plate P3 include the thickness of the formed coatings.

The coating is made of a material such as fluorine, nitrile rubber or the like or an elastomer and is provided for the purpose of the improvement of close contact and sealing properties with the opposite material, but a top coating such as graphite or wax may be applied on a surface of the coating in order to ensure slip properties or non-adhesiveness as necessary.

As illustrated in FIG. 2, the plate thickness reference of the cylinder head gasket 1 is on the cylinder block 3 side in this embodiment, but this plate thickness reference may be on the cylinder head 2 side or on a plate thickness center of each of the plates P1 to P3.

An outer edge of the gas seal plate P1 is located outside of an inner edge portion of an opening portion of the water jacket 4a, and an inner edge of the main plate P3 is connected at the substantially center of the water jacket 4a.

As described above, by connecting the gas seal plate P1 and the main plate P3 within a range of the opening portion of the water jacket 4a, the concentration of a stress to a connection position where the plate thicknesses are different is prevented during engine assembling.

The connection position between the gas seal plate P1 and the main plate P3 may be located closer to the combustion chamber hole 11 side than the inner edge of the opening portion of the water jacket 4a in order to increase a contact pressure at the periphery of the combustion chamber.

Subsequently, a full bead 15 surrounding each of the four combustion chamber holes 11 and swollen toward the cylinder head 2 is provided on the gas seal plate P1.

A one-dot-chain line in FIG. 1 indicates a position of a ridge line on a top in each of the above-described full beads 15 or each of half beads described below.

This full bead 15, as an inner bead, is formed inwardly of the opening portion of the water jacket 4a and when sandwiched between the cylinder block 3 and the cylinder head 2, the combustion gas from the combustion chamber hole 11 is sealed by this full bead 15 and also cooling water from the above-described water passage is sealed.

The oil seal plate P2 is provided on each of the four oil passages formed in the cylinder block 3 and the cylinder head 2 and its outer edge is formed so that a width from the opening portion of the oil hole 13 becomes as small as possible.

Moreover, as illustrated in FIG. 2, a first half bead 16 surrounding the oil hole 13 and swollen to the cylinder head 2 side is formed on the oil seal plate P2, and the outer edge of the oil seal plate P2 is formed so as to surround this first half bead 16.

By means of the above configuration, the first half bead 16 seals the lubricant oil communicating through the oil passage when sandwiched between the cylinder block 3 and the cylinder head 2.

The main plate P3 is provided within a range sandwiched between the cylinder block 3 and the cylinder head 2 except the range on which the gas seal plate P1 and the oil seal plate P2 are provided.

A second half bead 17 surrounding the four combustion chamber holes 11 and the water hole 14 and swollen to the cylinder block 3 side is formed on the main plate P3.

These second half beads 17 are formed on the outside of the opening portion of the water jacket 4a with substantially constant intervals and formed so as to avoid a position where the bolt hole 12 is formed.

By means of this configuration, the second half bead 17 seals the cooling water from the water passage when sandwiched between the cylinder block 3 and the cylinder head 2.

That is, the cooling water communicating through the water passage is sealed by the full bead 15 of the gas seal plate P1 and the second half bead 17 of the main plate P3.

Subsequently, the bolt hole 12 is located between the first half bead 16 of the oil seal plate P2 and the second half bead 17 of the main plate P3, and a quarter bead 18 surrounding this bolt hole 12 and swollen to the cylinder block 3 side is formed.

The quarter bead 18 does not necessarily have to be provided.

According to the cylinder head gasket 1 having the above configuration, by connecting three types of plates with different plate thicknesses, that is, the gas seal plate P1, the oil seal plate P2, and the main plate P3, the cylinder head gasket 1 having a single layer can be obtained, and an inexpensive cylinder head gasket 1 can be obtained.

Moreover, since the plate thicknesses of the gas seal plate P1, the oil seal plate P2, and the main plate P3 are different, when the cylinder block 3 and the cylinder head 2 are fastened by a bolt, different loads can be made to act on each of the plates P1 to P3.

Furthermore, since each of the plates P1 to P3 is connected without overlapping in the first embodiment, a load does not concentrate on the overlapped portion as compared with the connection of the plates with overlapping, and plate-thickness management is facilitated.

Since the plate thickness of the gas seal plate P1 is larger than the plate thicknesses of the oil seal plate P2 and the main plate P3, the sealing properties in the periphery of the combustion chamber hole 11 can be obtained by increasing the load in the periphery of the combustion chamber hole 11.

On the other hand, since the plate thickness of the oil seal plate P2 is smaller than that of the main plate P3, a load concentrates on the main plate P3 side in which the bolt hole 12 is drilled, and the load on the oil seal plate P2 side can be alleviated, and a load to the first half bead 16 can be suppressed.

Therefore, even if a load around the oil hole 13 is increased by a thermal change during engine operation, collapse of the first half bead 16 is suppressed, and the lubricant oil from the oil passage can be sealed.

Figure 4:
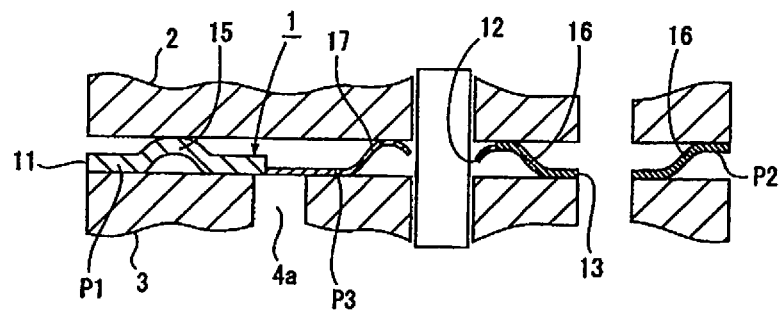
FIG. 4 is a sectional view of a cylinder head gasket according to a second embodiment.

FIG. 4 illustrates a sectional view of the cylinder head gasket 1 according to a second embodiment, and this view illustrates the same portion in the cylinder head gasket 1 of the first embodiment as the section illustrated in FIG. 2.

In the cylinder head gasket 1 according to this second embodiment, the plate thickness of the gas seal plate P1 is the largest, while the plate thickness of the oil seal plate P2 is larger than that of the main plate P3.

Since the other configurations are the same as those in the cylinder head gasket 1 in the first embodiment, further explanation will be omitted.

By means of the above-described configuration, since the plate thickness of the gas seal plate P1 is larger than the plate thicknesses of the oil seal plate P2 and the main plate P3 similarly to the first embodiment, favorable sealing properties in the periphery of the combustion chamber hole 11 can be obtained.

On the other hand, since a load larger than that on the main plate P3 acts on the oil seal plate P2, the lubricant oil from the oil hole 13 immediately after the engine is started can be sealed by increasing the load in the periphery of the oil hole 13.

Figure 5:
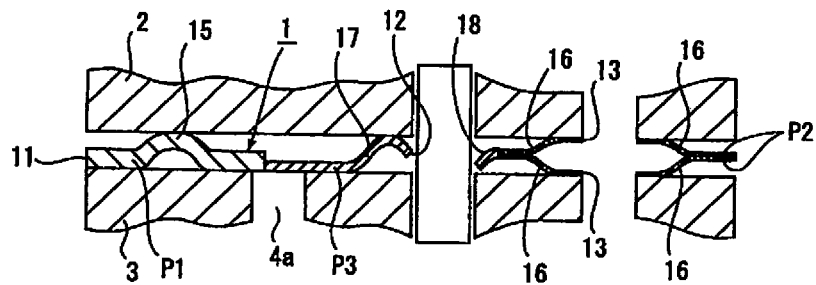
FIG. 5 is a sectional view of a cylinder head gasket according to a third embodiment.

FIG. 5 illustrates a sectional view of the cylinder head gasket 1 according to a third embodiment, and this view illustrates the same portion in the cylinder head gasket 1 of the first embodiment as the section illustrated in FIG. 2.

The cylinder head gasket 1 according to this third embodiment has a configuration in which two oil seal plates P2 are laminated, and the total plate thickness of these two oil seal plates P2 is smaller than the plate thickness of the main plate P3 similarly to the first embodiment.

By means of the above-described configuration, since the plate thickness of the gas seal plate P1 is larger than the plate thicknesses of the oil seal plate P2 and the main plate P3 similarly to the first embodiment, a load in the periphery of the combustion chamber hole 11 can be increased, and favorable sealing properties can be obtained.

Moreover, since the plate thickness of the oil seal plate P2 is smaller than that of the main plate P3, a load on the half bead formed on the oil seal plate P2 can be suppressed by fastening of a bolt, and the lubricant oil from the oil passage can be sealed by suppressing collapse of the half bead.

Figure 6:
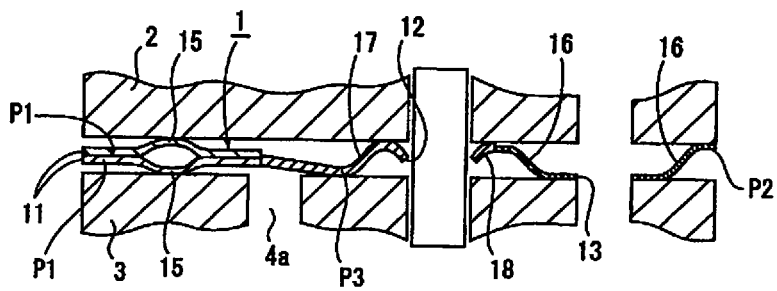
FIG. 6 is a sectional view of a cylinder head gasket according to a fourth embodiment.

FIG. 6 illustrates a sectional view of the cylinder head gasket 1 according to a fourth embodiment, and this view illustrates the same portion in the cylinder head gasket 1 of the first embodiment as the section illustrated in FIG. 2.

The cylinder head gasket 1 according to this fourth embodiment has a configuration in which two gas seal plates P1 are laminated, and though the plate thickness of each gas seal plate P1 is smaller than that of the main plate P3, the total plate thickness of these two gas seal plates P1 is larger than the plate thicknesses of the main plate P3 and the oil seal plate P2 similarly to the first embodiment.

The full bead 15 is formed toward the cylinder head 2 and the cylinder block 3 on each of the two gas seals, respectively.

By means of the above-described configuration, since the plate thickness of the gas seal plate P1 is larger than the plate thicknesses of the oil seal plate P2 and the main plate P3 similarly to the first embodiment, a load in the periphery of the combustion chamber hole 11 can be increased, and favorable sealing properties can be obtained.

Moreover, by reducing the plate thickness of a single gas seal and by forming the full bead 15 on each of the two gas seals, the combustion gas can be sealed by the two full beads 15, and a follow-up performance of the cylinder head 2 and the cylinder block 3 to a gap can be improved.

Since the plate thickness of the oil seal plate P2 is smaller than that of the main plate P3 similarly to the first embodiment, a load to the half bead formed on the oil seal plate P2 can be suppressed by fastening of a bolt, and the lubricant oil from the oil passage can be sealed by suppressing collapse of the half bead.

Regarding the oil seal plate P2, the plate thickness of the oil seal plate P2 may be set larger than that of the main plate P3 as in the second embodiment, whereby the lubricant oil from the oil hole 13 immediately after the engine is started can be sealed.

Figure 7:
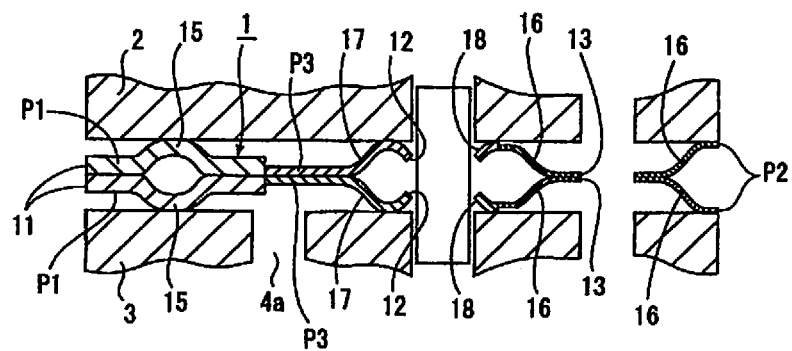
FIG. 7 is a sectional view of a cylinder head gasket according to a fifth embodiment.

FIG. 7 illustrates a sectional view of the cylinder head gasket 1 according to a fifth embodiment, and this view illustrates the same portion in the cylinder head gasket 1 of the first embodiment as the section illustrated in FIG. 2.

The cylinder head gasket 1 of this embodiment has two layers of the cylinder head gasket 1 in the first embodiment, and the full bead 15 and the half bead are arranged so as to swell to the cylinder head 2 side and to the cylinder block 3 side, respectively.

By means of the above-described configuration, the effect of the cylinder head gasket 1 in the first embodiment can be obtained more effectively.

In this embodiment, the plate thickness of the oil seal plate P2 may be set larger than that of the main plate P3 similarly to the second embodiment.

Figure 8:
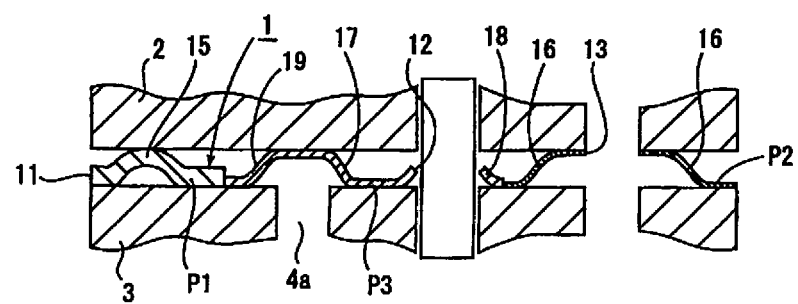
FIG. 8 is a sectional view of a cylinder head gasket according to a sixth embodiment.

FIG. 8 illustrates a sectional view of the cylinder head gasket 1 according to a sixth embodiment, and this view illustrates the same portion in the cylinder head gasket 1 of the first embodiment as the section illustrated in FIG. 2.

The cylinder head gasket 1 of this embodiment has a configuration in which the connection portion between the gas seal plate P1 and the main plate P3 is located inside the opening portion of the water jacket 4a as compared with the cylinder head gasket 1 in the first embodiment and moreover, a third half bead 19 swollen toward the cylinder head side is formed on the main plate P3 at a position inside the opening portion of the water jacket 4a.

As a result, the second half bead 17 provided on the main plate P3 and a first half bead 16 provided on the oil seal plate P2 are formed so as to swell to the cylinder block 3 side from the cylinder head 2 side, and the quarter bead 18 provided on the main plate P3 is formed so as to swell to the cylinder head 2 side from the cylinder block 3.

By means of the above-described configuration, the cooling liquid communicating through the water passage can be sealed by the second half bead 17 and the third half bead 19 provided on the main plate P3.

In each of the above-described embodiments, the half bead may be replaced by the full bead, respectively, whereby a higher sealing property can be obtained.

Moreover, in each of the above-described embodiments, each of the plates P1 to P3 are connected in a state they are abutted to each other without overlapping, but the end portions may be overlapped and connected to each other.

In that case, the connection position between the gas seal plate P1 and the main plate P3 is preferably within a range in which the water jacket 4a is opened as in the above-described embodiment.

Moreover, in each of the above-described embodiments, if the positions of the bolt hole 12 and the oil hole 13 are close, the bolt hole 12 may be provided in the oil seal plate P2.

In this case, the bolt hole 12 separated from the oil hole 12 may be drilled in the plate having the same plate thickness as the oil seal plate P2, and the plate may be connected to the main plate.

Furthermore, in the case of an engine in which a water jacket is not formed in the cylinder block and a block-side passage and a head-side passage are formed at predetermined positions, the bead surrounding the water hole 14 which makes them communicate with each other may be provided to replace the second half bead 17, as an outer bead, and to seal the cooling water.

REFERENCE SIGNS LIST

1 cylinder head gasket
2 cylinder head
3 cylinder block
4a water jacket
11 combustion chamber hole
12 bolt hole
13 oil hole
14 water hole
P1 gas seal plate
P2 oil seal plate
P3 main plate

The invention claimed is:

1. A cylinder head gasket sandwiched between a cylinder block and a cylinder head in which a combustion chamber, an oil passage, a water passage, and a bolt insertion passage are formed and provided with a combustion chamber hole drilled at a position of the combustion chamber, an oil hole drilled at a position of the oil passage, and a plurality of bolt holes drilled in conformity with a position of the bolt insertion passage, wherein
the cylinder head gasket comprises a one piece gas seal plate in which the combustion chamber hole is drilled, an oil seal plate in which the oil hole is drilled, and a main plate provided between the gas seal plate and the oil seal plate and in which the plurality of bolt holes are drilled; the gas seal plate is provided with a bead surrounding the combustion chamber hole, the oil seal plate is provided with a bead surrounding the oil hole, and the main plate is provided with a bead surrounding each of the plurality of bolt holes;
the plate thicknesses of the gas seal plate, the oil seal plate, and the main plate are different from each other, and the plate thickness of the gas seal plate is larger than the plate thicknesses of the oil seal plate and the main plate; and
mutually adjacent end portions of the gas seal plate, the oil seal plate, and the main plate are connected to each other.

2. The cylinder head gasket according to claim 1, wherein an inner bead surrounding the combustion chamber hole is provided as a bead between the combustion chamber hole and an opening portion of the water passage in the gas seal plate and an outer bead surrounding the opening portion of the water passage is provided on the main plate; and
water in the water passage is sealed by the inner bead and the outer bead.

3. The cylinder head gasket according to claim 1, wherein between a joint portion of the gas seal plate in the main plate and a portion where the opening portion of the water passage overlap, an inner bead surrounding the joint portion is provided, and an outer bead surrounding the portion where the water passage is overlapped is provided; and
water in the water passage is sealed by the inner bead and the outer bead of the main plate.

4. The cylinder head gasket according to claim 1, wherein a water hole is drilled in the main plate at a position of the water passage and a bead surrounding the water hole is provided.

5. The cylinder head gasket according to claim 1, wherein the plate thickness of the main plate is larger than the plate thickness of the oil seal plate.

6. The cylinder head gasket according to claim 1, wherein the plate thickness of the main plate is smaller than the plate thickness of the oil seal plate.

7. The cylinder head gasket according to claim 1, wherein a plurality of layers of the gas seal plates are laminated, and the total plate thickness of the laminated gas seal plates is larger than the plate thicknesses of the oil seal plate and of the main plate.

8. The cylinder head gasket according to claim 1, wherein a plurality of layers of the oil seal plates are laminated, and the total plate thickness of the laminated oil seal plates is smaller than the plate thickness of the gas seal plate.

9. The cylinder head gasket according to claim 1, wherein a plurality of layers, in each layer of which the gas seal plates, the oil seal plates, and the main plates are connected, are laminated.

10. The cylinder head gasket according to claim 1, wherein a water jacket is formed as a water passage in the cylinder block; and
a joint portion between the gas seal plate and the main plate is located inwardly of an outer edge of the water jacket.

11. The cylinder head gasket according to claim 1, wherein the plate thickness of each of the gas seal plate, the oil seal plate, and the main plate is the total of the thickness of the metal plate and a coating formed on at least either one of a front face or a back face of the metal plate.

12. The cylinder head gasket according to claim 1, wherein the mutually adjacent end portions of the gas seal plate, the oil seal plate, and the main plate abut each other so as not to overlap, and the abutting portions are connected by welding.

* * * * *